(No Model.)

J. BERKHOLZ.
Clutching and Releasing Device for Shafts.

No. 232,926. Patented Oct. 5, 1880.

WITNESSES.

INVENTOR.
John Berkholz
by his Attorneys
Howson and Son

UNITED STATES PATENT OFFICE.

JOHN BERKHOLZ, OF PHILADELPHIA, PENNSYLVANIA, ASSIGNOR OF ONE-HALF OF HIS RIGHT TO JAMES P. HALL, OF SAME PLACE.

CLUTCHING AND RELEASING DEVICE FOR SHAFTS.

SPECIFICATION forming part of Letters Patent No. 232,926, dated October 5, 1880.

Application filed August 27, 1880. (No model.)

*To all whom it may concern:*

Be it known that I, JOHN BERKHOLZ, a subject of the Emperor of Germany, residing in Philadelphia, Pennsylvania, United States of America, have invented an Improvement in Clutching and Releasing Devices for Shafts, of which the following is a specification.

My invention relates to improvements in clutches applicable, mainly, to sewing-machines, and the main object of my invention is to so construct the clutch that it can be readily applied to the driving-shaft and fly-wheel of any sewing-machine.

Figure 3:
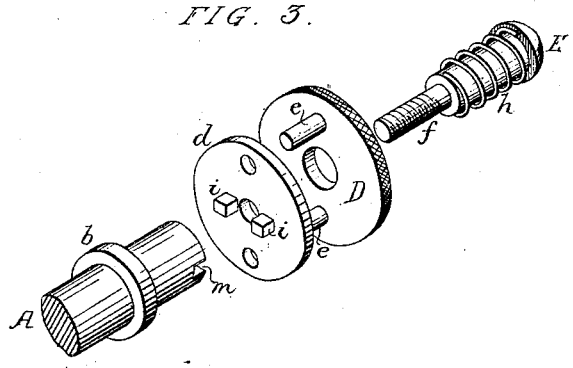
Figure 1:
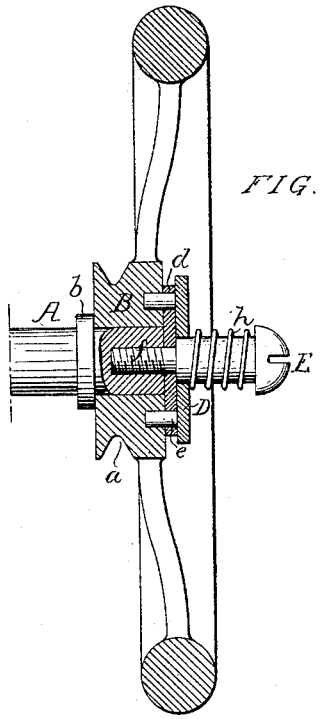
Figure 2:
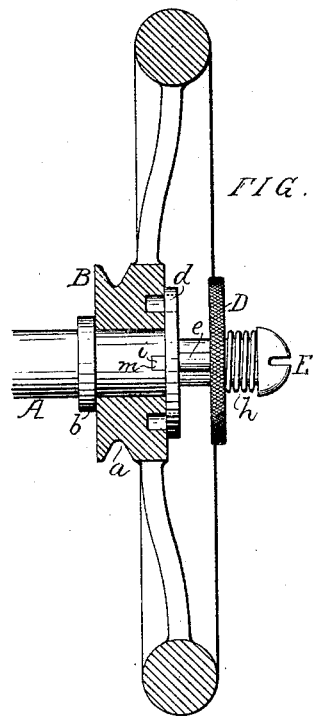

In the accompanying drawings, Figures 1 and 2 are views, partly in section, of my improved clutch in its two positions; and Fig. 3, a perspective view of the different parts which compose the clutch.

A is the driving-shaft of a sewing-machine, and B the hub of the fly-wheel, the said hub having a groove, $a$, for receiving the driving-belt, and being confined longitudinally on the shaft, between the fixed collar $b$ and plate $d$. The end of the shaft and outer face of the hub of the wheel are in the same plane, and against both bears the said plate $d$, which has two or more openings for receiving the pins $e\ e$ of the clutch D.

The reduced portion $f$ of a central stud, E, passes through the plate $d$ and is screwed into a threaded central orifice in the shaft A, and on the enlarged portion of the stud the clutch D is at liberty to turn when pulled outward to the position shown in Fig. 2, a spring, $h$, which intervenes between the head of the stud and the clutch, tending to force the latter to the position shown in Fig. 1.

The plate $d$ has on one side two projections, $i\ i$, adapted to a slot, $m$, in the end of the shaft A, so that the shaft and plate must turn together, whether the fly-wheel is loose on the shaft or has been clutched thereto.

When the several parts are in the position shown in Fig. 1, where the pins $e\ e$ of the clutch D pass through the plate $d$ and into orifices in the hub of the wheel, the latter will be clutched to the shaft; but on seizing the serrated edge of the clutch D, drawing it outward to the position Fig. 2, and then turning the clutch so that its pins $e\ e$ may bear against any part of the plate $d$ where the holes for receiving the pins do not occur the wheel will be free to revolve independently of the shaft.

The main advantage of my improved clutch is the facility with which it can be applied to any sewing-machine, all that is necessary for such application being the boring of a central hole in the end of the driving-shaft, the threading of that hole for the reception of the screw-stud, the formation of the slot $m$, and the boring of the orifices in the hub of the wheel for receiving the pins $e\ e$ of the clutch.

It is immaterial whether the shaft A of the machine is turned from or toward the operator, as the lugs $i$ on the plate $d$ engage with the slot $m$ in the shaft and prevent said plate from turning independently of the shaft in either direction.

A single pin, $e$, only, on the clutch D may suffice in some cases, or more than two pins may be used, if desired.

I claim as my invention—

1. The shaft A, wheel B, central stud, E, and plate $d$, arranged to turn with the said shaft, in combination with the spring-clutch D and its pin or pins $e$, adapted to openings in the said plate $d$ and in the hub of the wheel, all substantially as set forth.

2. The combination of the shaft A, having a slot, $m$, the wheel-hub B, having openings, the plate $d$, having openings, and lugs $i$, the clutch-plate D, having pin or pins $e$, the screw-stud E, and the spring $h$, as set forth.

In testimony whereof I have signed my name to this specification in the presence of two subscribing witnesses.

JOHN BERKHOLZ.

Witnesses:
JAMES F. TOBIN,
HARRY SMITH.